(12) United States Patent
Topp

(10) Patent No.: US 10,157,062 B2
(45) Date of Patent: Dec. 18, 2018

(54) METHOD FOR OPERATING A MICROPROCESSOR

(71) Applicant: Robert Bosch GmbH, Stuttgart (DE)

(72) Inventor: Jaroslaw Topp, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 79 days.

(21) Appl. No.: 15/444,460

(22) Filed: Feb. 28, 2017

(65) Prior Publication Data

US 2017/0249145 A1  Aug. 31, 2017

(30) Foreign Application Priority Data

Feb. 29, 2016  (DE) .................. 10 2016 203 283

(51) Int. Cl.
*G06F 9/30* (2018.01)
*G06F 8/52* (2018.01)

(52) U.S. Cl.
CPC .............. *G06F 9/3017* (2013.01); *G06F 8/52* (2013.01); *G06F 9/3001* (2013.01); *G06F 9/30021* (2013.01)

(58) Field of Classification Search
None
See application file for complete search history.

(56) References Cited

U.S. PATENT DOCUMENTS

| | | | | |
|---|---|---|---|---|
| 5,930,509 A | * | 7/1999 | Yates | G06F 9/4552 717/146 |
| 7,496,494 B2 | * | 2/2009 | Altman | G06F 9/45537 703/23 |
| 2005/0149915 A1 | * | 7/2005 | Wu | G06F 9/45516 717/137 |
| 2016/0381050 A1 | * | 12/2016 | Shanbhogue | G06F 9/30145 726/23 |

* cited by examiner

*Primary Examiner* — Corey S Faherty
(74) *Attorney, Agent, or Firm* — Norton Rose Fulbright US LLP; Gerard Messina

(57) ABSTRACT

A method is described for operating a microprocessor, in which a conversion software executed in the microprocessor carries out a binary translation, in the course of which a source instruction that is encoded according to a first instruction-set architecture is translated into a target instruction in a binary manner, which is encoded according to a second instruction-set architecture, and the target instruction translated by the translation software into the second instruction-set architecture being replicated, and in this replicated target instruction a memory area which is to be accessed in the course of the execution of the target instruction is replaced by a second memory area, and the target instruction and the copied target instruction is executed by the microprocessor. With the aid of the method, a temporal redundancy is achieved by a (temporally) parallel execution of the target instruction on a processor core and a local or regional redundancy by a parallel execution of the target instruction on different processor cores.

10 Claims, 2 Drawing Sheets

METHOD FOR OPERATING A MICROPROCESSOR

FIELD OF THE INVENTION

The present invention relates to a method for operating a microprocessor and to an arithmetic unit and a computer program for its execution.

BACKGROUND INFORMATION

Microprocessors are frequently used on their own or as part of microcontrollers that also include additional periphery on the chip such as network interfaces, ADC, DAC, I/O etc. in addition to the microprocessor.

Modern microprocessors as they are used in control units of motor vehicles, for instance (e.g., in engine control devices for the engine control) are most often multicore processors having multiple (at least two) processor cores. A processor core includes an arithmetic logic unit (ALU), which represents the actual electronic arithmetic unit for the execution of tasks, programs, arithmetic instructions etc., and furthermore a local memory. Such a local memory may be developed as a register set made up of one or multiple register(s) or as a RAM, for example. In addition, the microprocessor includes a global memory which can be developed as flash memory, NOR-flash or RAM, for instance.

Program code that is to be executed by a microprocessor is often encoded in a special instruction-set architecture of the microprocessor.

A command set architecture describes the instruction set of a microprocessor, i.e., the quantity of instructions that can be executed by the microprocessor, as well as the binary coding of the instruction set. The instruction-set architecture may also describe data types and the set-up of data structures, a memory architecture and the addressing of memory areas. Furthermore, special behavior types of the microprocessor, e.g., the manner in which it responds to an interrupt request, are able to be described by the instruction-set architecture.

SUMMARY

According to the present invention, a method for operating a microprocessor as well as a microprocessor and a computer program for its execution are provided.

Within the framework of the present method, a conversion software (generally known as dynamic binary translation software), by which a binary translation of program code is performed, is executed in the microprocessor. In the process, a source instruction, which is encoded according to a first instruction-set architecture (ISA), is translated in a binary manner into a corresponding target instruction, which is encoded according to a second instruction-set architecture. Source instruction and target instruction are thus identical, especially with regard to their content, and composed according to different instruction-set architectures. The first and the second instruction-set architecture may respectively be an x86 architecture or ARM architecture, for instance.

The target instruction translated into the second instruction-set architecture is replicated by the conversion software. In this replicated target instruction, a memory area which is to be accessed within the scope of the execution of the target instruction is replaced by a second memory area. This memory area in particular may be a target memory into which results of the executed target instruction are to be written. In particular, this may be a local memory of the processor such as a register set of one or multiple register(s) or a RAM. In particular, the memory area is able to be replaced by renaming the address of the memory area or the corresponding memory register in the source code of the target instruction. The target instruction and the replicated target instruction are executed by the microprocessor.

In order to allow for an execution of instructions by the microprocessor, these instructions must be encoded in the special second instruction-set architecture of the microprocessor. Processors of different manufacturers are often encoded according to different, manufacturer-specific instruction-set architectures. In order to be able to execute program code developed for a particular microprocessor according to its specific instruction-set architecture (so-called emulated ISA) in some other microprocessor from a different manufacturer, the program code is translated from its specific original first instruction-set architecture (emulated ISA) into the second instruction-set architecture of the other microprocessor (so-called native ISA). The corresponding binary translation is able to be carried out by the conversion software.

In an especially advantageous manner, a dynamic binary translation is performed within the framework of the method, during which individual instructions or individual parts of the program code are translated as soon as these instructions are called up and to be executed. However, it is also possible to carry out a static binary translation, in the course of which the entire program code, and thus all of the instructions of the program code, are translated before individual instructions of the program code are carried out.

It is understood that a multitude of different source instructions are able to be translated in a binary manner by the conversion software within the framework of the present method. For practical purposes, all of the corresponding translated target instructions, or also only special target instructions, may be replicated and their memory areas replaced. In order to have the translated and the replicated target instruction executed by the microprocessor, the conversion software forwards these two instructions in particular to corresponding modules of the microprocessor, such as to a scheduler, which coordinates the execution of instructions. In particular, the two instructions are executed by an arithmetic logic unit (ALU), the electronic arithmetic unit for the execution of tasks, programs, arithmetic instructions, etc.

Within the scope of the present method, the conversion software is provided not only for the binary translation but is supplemented by two additional functions, i.e. a replication function and a renaming function. As a result, it is possible to implement a redundant execution of instructions in the microprocessor in an uncomplicated manner. By replicating the target instruction, the target instruction is executed twice by the microprocessor and the results of the doubly executed target instruction are written into respective different memory areas. The two target instructions may be executed in parallel or also one after the other, for instance.

Depending on the use of the microprocessor, such a redundancy may be required for safety-related reasons. Especially in the automotive field, standards such as the ISO 26262 standard require the redundant execution of special safety-relevant functions. The execution of functions of the microprocessor according to the ISO safety standard 26262 or the ASIL (Automotive Safety Integrity Level) defined therein is able to be ensured with the aid of the present method. In particular, it is possible to comply with the safety guidelines according to ASIL C and ASIL D, which represent the highest and strictest safety requirements of the ISO 26262. The method is therefore particularly suitable for the use by the microprocessor in a motor vehicle. Especially preferably, the target instructions execute safety-relevant automotive functions that must be ensured in a redundant manner according to the specified safety guidelines.

In addition, the present invention makes it possible to implement new functions in the microprocessor in an uncomplicated manner without modifying its hardware. For example, it is not necessary to install additional processors or processor cores or additional memories in the microprocessor in order to increase its computing capacity, for example. These additional functions are able to be added simply by modifications of the conversion software.

The corresponding conversion software providing the additional functions may also be installed in the microprocessor after it is finished, in particular when it has already been delivered or is in its normal operation. For example, the additional functions or the correspondingly updated conversion software may be installed in the microprocessor within the framework of an update, such as during service operations, with the aid of a connected computer or also with the aid of what is known as over-the-air programming (OTA), in which new, revised program code is wirelessly transmitted to the microprocessor via a radio link, such as WLAN or mobile telephony networks (e.g., LTE, GSM, 3G, 4G etc.), for instance from a server of the manufacturer of the microprocessor.

In most cases microprocessors are developed and produced for a broad market and frequently are not explicitly manufactured for use in a motor vehicle, for example. Commercially available microprocessors thus do not necessarily satisfy the demands imposed in the automotive field. An explicit production of microprocessors for the automotive field, for instance such that special motor vehicle functions are able to be executed on the basis of hardware or such that the special hardware architecture of the microprocessor is tailored to the execution of automotive functions, often entails very high expense. However, the present method allows for an uncomplicated retrofitting of a microprocessor for use in the automotive field and for the execution of motor vehicle functions.

The hardware architecture of a microprocessor is usually defined at the beginning of its planning and development phase, e.g., according to the functionalities it will most likely execute in its subsequent regular operation. In the further course of the development and production phase of the microprocessor, it is often not easily possible, or at least only at considerable effort in terms of development technology and expense, to still modify the hardware architecture. For example, if a decision is made during the development stage that the microprocessor is to execute additional functions not envisioned so far, in most cases it is no longer possible to adapt the hardware architecture to these functions. However, using the present method, such functions can be implemented in the microprocessor nevertheless and in a manner that requires little effort and expense, simply by using the corresponding conversion software.

According to one advantageous specific embodiment, a result of the executed target instruction and a result of the executed replicated target instruction are compared to one another. Thus, it is possible to realize what is called a lockstep, in particular, during the course of which results of identical instructions executed in duplicate are compared to one another for error detection and error correction. Such a lockstep or a corresponding error detection is required in the motor vehicle, for instance by the ISO 26262 standard, especially when safety-relevant functions are executed.

This comparison of the results is preferably performed by carrying out a comparison instruction. This comparison instruction is advantageously generated by the conversion software with the replication of the target instruction and expediently transferred to the scheduler of the microprocessor. Therefore, in addition to the replication and renaming function, the conversion software is preferably expanded by a comparison function.

The microprocessor preferably has one or more processor core(s). The conversion software is advantageously executed in parallel on at least two of these processor cores. The microprocessor and the translated target instruction are thus less susceptible to errors and failures of individual processor cores. As a result, it is not only possible to achieve temporal redundancy by a (temporally) parallel execution of the target instruction on a processor core, but also a local or regional redundancy, through the parallel execution of the target instruction on different processor cores. In addition, it is therefore possible to carry out an even more precise error detection and error correction, in particular by comparing the individual results of the target instructions executed on the processor cores and the replicated target instructions to one another.

According to an especially preferred specific embodiment, a second processor core of the microprocessor is provided, which checks a first processor core. The first processor core is provided as a master core, in particular. For practical purposes, the second processor core or check core is not visible to an operating system that is executed by the first master core, in particular.

The conversion software is executed on the first processor core according to the above description. The translated target instruction obtained through the binary translation is stored in a translation memory (translation cache). Both the master core and the check core have access to this translation memory, which may be developed as a global memory of the microprocessor, for example. In addition, the translated target instruction is replicated by the conversion software in the first processor core, and the memory area in the replicated target instruction is replaced with the second memory area. The target instruction and the replicated target instruction are executed in the first processor core.

A second conversion software is preferably executed in the second processor core. This second conversion software is expediently a slightly modified version of the software executed in the first processor core. The second conversion expediently does not carry out a binary translation of the target instruction itself but preferably reads out the translated target instruction stored in the translation memory. Since the check core is not visible to the operating system, it is especially unable to carry out any memory operations so that a data consistency is able to be ensured in the system. In particular, the second processor core therefore also does not carry out any replication function. Instead, the second conversion software modifies the read-out translated target instruction, preferably in such a way that a memory area that is to be accessed during the execution of the read-out target instruction is replaced by a third memory area. This modified target instruction is executed in the second processor core.

The results of the target instruction executed in the first processor core and the replicated target instruction as well as the modified target instruction executed in the second processor core are compared with each other, especially for an error detection and error correction. Permanent errors, in particular, are able to be detected in this way, which, for instance, may have as their source faulty input parameters or hardware defects of the microprocessor.

According to an especially advantageous specific embodiment of the present method, the microprocessor is used in a control device of a motor vehicle. Preferably, a safety-relevant function and/or a driver-assistance function of the motor vehicle are/is carried out by executing the target instruction. For instance, the target instruction can be carried out within the scope of an engine control as a safety-relevant function, for example, or it is possible to influence the steering system, brake, acceleration etc. through the target instruction.

Examples of driver-assistance functions are an adaptive cruise control ACC, a cornering assistant, parking assistant, lane-keeping assistant, an autonomous longitudinal control, an alertness assistant or a fatigue detection, an electronic stability program ESP, engine drag-torque control, transmission-slip control (TSC), anti-lock braking system (ABS) and functions within the scope of automated driving.

A microprocessor according to the present invention, e.g. of a control device of a motor vehicle, is set up, especially in terms of software, to execute a method according to the present invention.

The implementation of the method in the form of a computer program is also advantageous since this entails particularly little expense, especially if an executing control device is also utilized for other tasks and is therefore provided as it is. Suitable data carriers for providing the computer program are magnetic, optical and electric memories such as hard disks, flash memories, EEPROMs, DVDs and others, in particular. A program download via computer networks (Internet, intranet etc.) is possible as well.

Additional advantages and developments of the present invention result from the description and the attached drawing.

The present invention is schematically shown in the drawing on the basis of exemplary embodiments and will be described in the following text with reference to the drawing.

DETAILED DESCRIPTION

Figure 1:
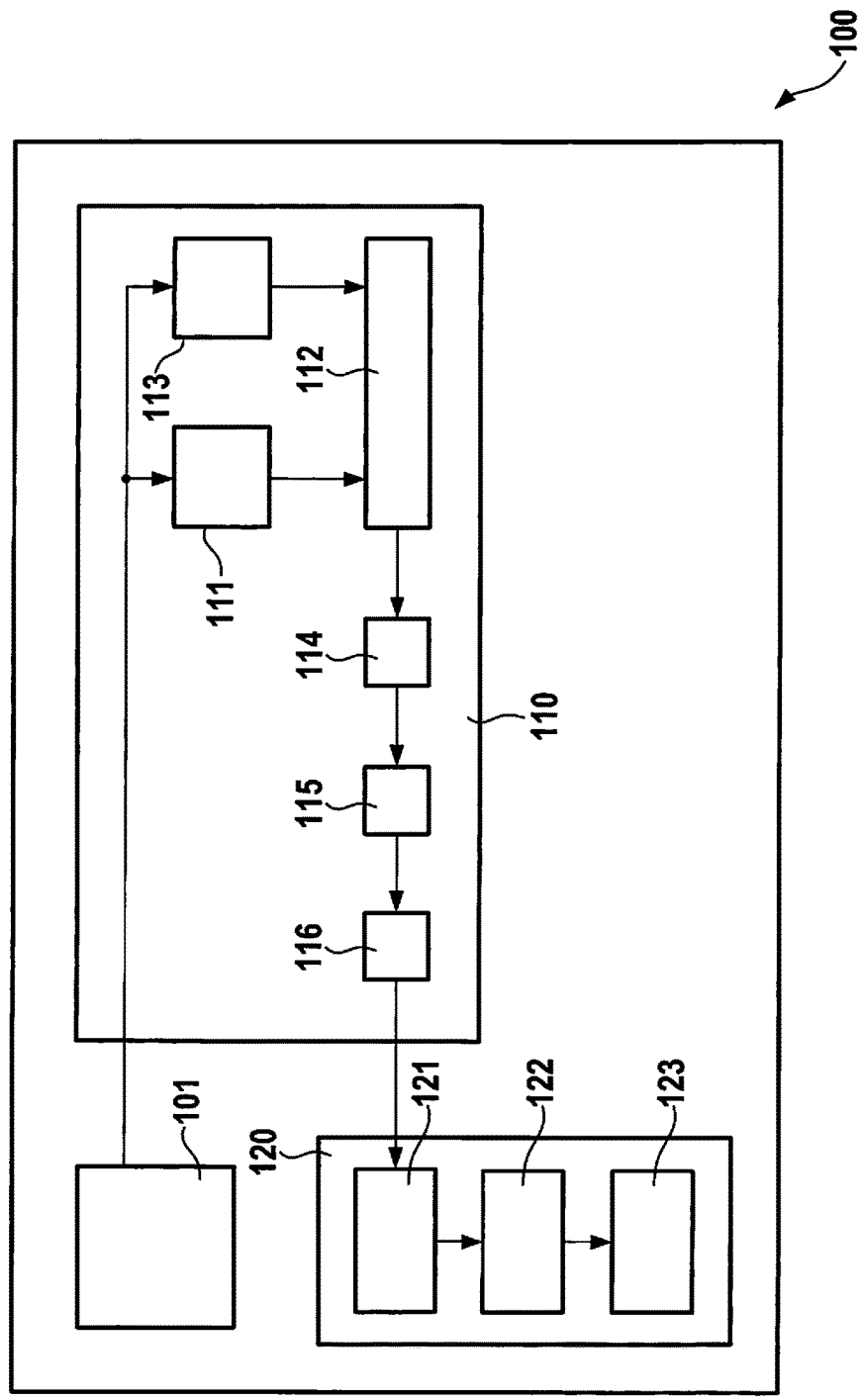
FIG. 1 shows schematically, a preferred further development of a microprocessor according to the present invention, which is set up to execute a preferred specific embodiment of a method according to the present invention.

FIG. 1 schematically shows a preferred further development of a microprocessor according to the present invention, which is denoted by 100. Microprocessor 100 is preferably part of a control device of a motor vehicle such as an engine control device, and is used for carrying out safety-relevant function within the scope of the engine control, for example.

In order to be able to satisfy safety conditions in the automotive field, such as those described in the ISO standard 26262, for example, microprocessor 100 is set up, in particular in terms of software, to execute a preferred specific embodiment of a method according to the present invention.

Within the scope of the present method, a program code, which is encoded in the x86 instruction-set architecture, for instance, is translated by a dynamic binary translation into an instruction-set architecture of the microprocessor. A redundant execution as well as error monitoring of the program code are carried out in addition. To do so, a conversion software 110, e.g., a so-called dynamic binary translation software, is executed in the microprocessor.

For example, the program code and corresponding source instructions are stored in a memory unit 101 of microprocessor 100, e.g., in a flash memory. The source instructions are read in from memory unit 101 by conversion software 110.

The dynamic binary translation of the source instructions is carried out by an interpretation function (interpreter) 111 of conversion software 110. After interpretation function 111 has translated the source instructions into target instructions, which are encoded in the instruction-set architecture of the microprocessor, the target instructions are temporarily stored in a cache memory 112.

An optimization function 113 (optimizer) allows for the compilation of the target instructions temporarily stored in cache memory 112. Certain attributes of the target instructions are able to be minimized or maximized, i.e. optimized, in the process; for example, the time required for executing the target instructions is able to be minimized.

Following the optimization, the target instructions are processed by a replication function 114, a renaming function 115, and a comparison function 116.

Replication function 114 replicates the target instructions, and renaming function 115 replaces a respective memory area indicated in the replicated target instructions with a second memory area by renaming the address of the respective memory area.

Comparison function 116 generates a comparison instruction for comparing the results of the target instructions and the corresponding replicated target instructions to one another.

For example, an associated sequence of target instructions (1), (2), (3) may look as follows:
(1) LD r0, r4
(2) LD r1, r5
(3) ADD r0, r1, r3

Through the first one of the above instructions (1), data from a register r4 are able to be loaded into a register r0, for instance. Similarly, with the aid of second above instruction (2), data from a register r5 can be loaded into a register r1. By third instruction (3), the values in registers r0 and r1 are added up and the corresponding result is written into register r3.

By using respective replication, renaming and comparison functions 114, 115, 116, the first one of the above target instructions (1) is changed to a set of three instructions (1), (1'), (1"), for instance:
(1) LD r0, r4
(1') LD r10, r4
(1") CMP r0, r10

Instruction (1') is replicated target instruction (1), for which register r0 was replaced by register r10 and correspondingly renamed. By instruction (1"), the contents of registers r0 and r10 are compared. If the contents of these two registers differ, then an error in the execution of instruction (1) may be inferred.

In an analogous manner, second target instruction (2) is modified by respective replication, renaming and comparison functions 114, 115, 116 to the following set of instructions (2), (2'), 2"), for example:
(2) LD r1, r5
(2') LD r11, r5
(2") CMP r1, r11

In replicated target instruction (2'), register r1 was replaced with register r11 and renamed. By instruction (2"), the contents of registers r1 and r11 are compared. A difference between the two registers indicates an error in the execution of the instruction (2).

It is also conceivable to modify target instructions (1) and (2) in such a way that a constant offset value is added to read-in data. For example, target instruction (1) may be modified to the following instruction set:

(1) LD r0, r4
(1*) LD r10, r4+63
(1") CMP r0, r10

According to this replicated instruction (1*), the contents of registers r4 and r63 are added up and loaded into register r10. For example, a corresponding constant offset value may be stored in register r63.

In a similar manner, target instruction (2) may be modified in the following manner:

(2) LD r1, r5
(2*) LD r11, r5+63
(2") CMP r1, r11

According to replicated instruction (2*) as well, the constant offset value from register r63 is added to the content of register r5.

The third target instruction is modified by respective replication, renaming and comparison function 114, 115, 116 to the following instruction set, for example:

(3) ADD r0, r1, r3
(3') ADD r10, r11, r13
(3") CMP r3, r13

In this case, two memory areas, in particular, are renamed in replicated target instruction (3'), i.e. register r0 to register r10, for one, and register r1 to register r11, for another. By instruction (3"), the contents of registers r3 and r13 are compared. A faulty execution of instruction (3) can be inferred if the two register contents differ.

After using respective replication, renaming and comparison functions 114, 115, 116, conversion software 110 forwards corresponding target instructions (1), (2), (3), replicated target instructions (1'), (2'), (3') or (1*), (2*), (3*) and comparison instructions (1"), (2"), (3") to special hardware modules 120 of microprocessor 100 where they are executed by these hardware modules 120.

For example, the instructions are first transmitted to a scheduler 121, which coordinates the temporal sequence according to which instructions are executed. According to this temporal sequence, the instructions are executed in an execution module 122, e.g. in an arithmetic logic unit (ALU). A write module 113 is able to write the results of the executed instructions into the corresponding memory areas or registers.

Figure 2:
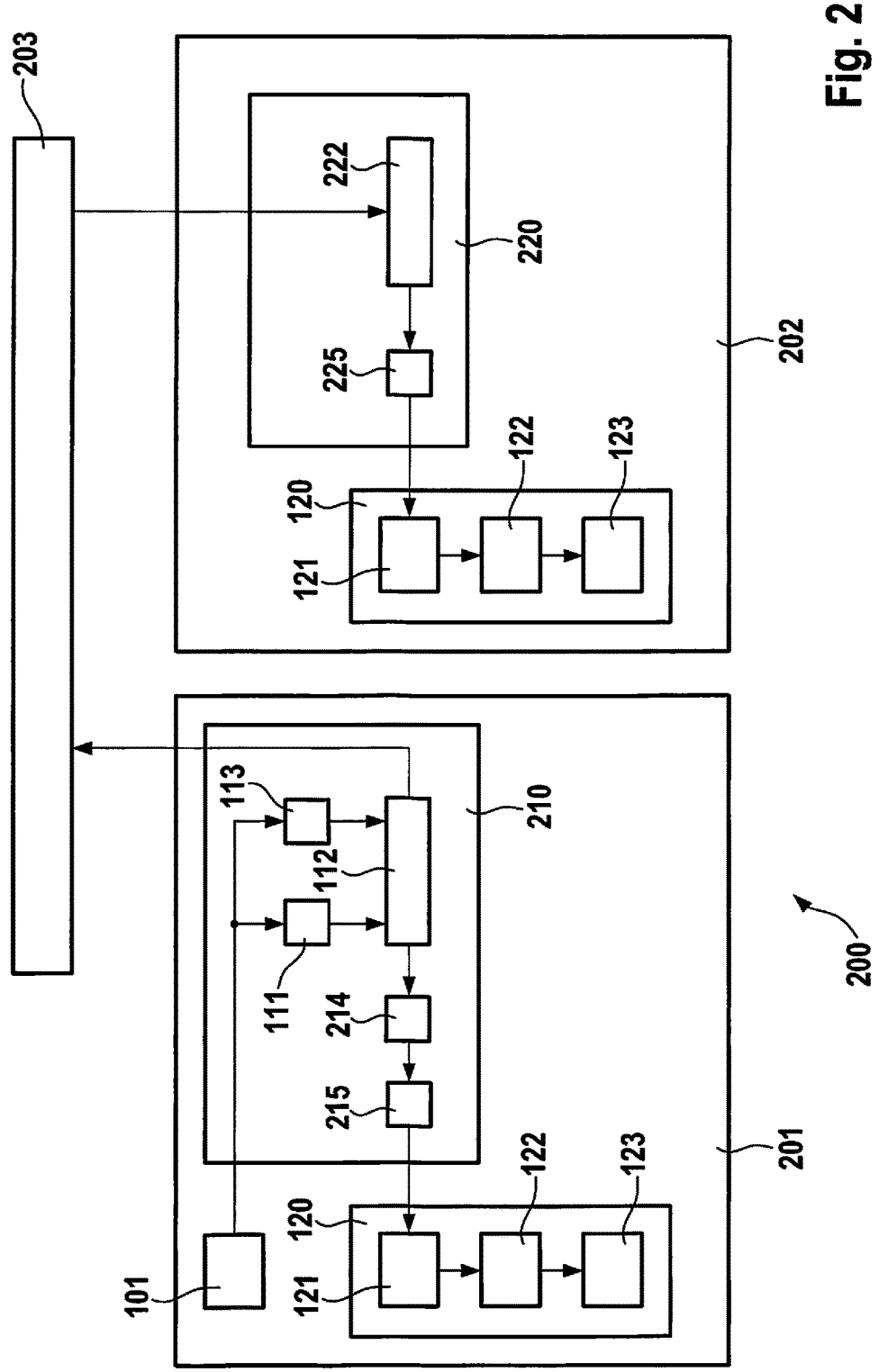
FIG. 2 shows schematically, another preferred further development of a microprocessor according to the present invention, which is set up to execute a preferred specific embodiment of a method according to the present invention.

FIG. 2 shows another preferred further development of a microprocessor according to the present invention, denoted by 200, which has two processor cores 201 and 202. Identical reference numerals in FIGS. 1 and 2 denote functions or elements that are identical (in their construction).

Analogous to microprocessor 100 from FIG. 1, microprocessor 200 from FIG. 2 is also used in a control device of a motor vehicle for the engine control.

A first processor core 201 is used as master core. Analogous to FIG. 1, a conversion software 210 is executed therein. In contrast to FIG. 1, however, only a replication function 214 and a renaming function 215 but no comparison function are executed by conversion software 210 in this particular example. Furthermore, the target instructions generated by interpretation function 111 and compiled by optimization function 113, which are temporarily stored in cache memory 112, are stored by conversion software 210 in a translation memory 203, which is developed as a global flash memory of microprocessor 200, for instance.

A second processor core 202 is used as a check core for checking master core 201. Check core 202 in particular is not visible to an operating system running in master core 201.

A second conversion software 220 is executed in check core 202. However, conversion software 220 executes neither interpretation nor optimization functions but reads out the target instructions stored in translation memory 203 and replicates them in a cache memory 222 of second processor core 202.

Since check core 202 is not visible to the operating system, it is especially unable to carry out any memory operations so that a data consistence can be ensured in the system. Second conversion software 220 therefore does not carry out any replication function either, but only a renaming function 225.

An associated sequence of target instructions, for example, may include target instructions (1), (2), (3) elucidated in connection with FIG. 1, as well as a further target instruction (4):

(1) LD r0, r4
(2) LD r1, r5
(3) ADD r0, r1, r3
(4) ST r3, r6

By fourth instruction (4), the result from register r3 is stored in a register r6.

Replication and renaming functions 214, 215 of conversion software 210 replicate instruction (4) and modify it in the following way:

(4') ST r3, r16

Register r6 is replaced by register r16 in replicated target instruction (4').

Renaming function 225 of second conversion software 220 directly renames the register of instruction (4). Renaming function 225 therefore modifies instruction (4) to following modified target instruction (4*):

(4*) ST r3, r16

Conversion software 210 forwards target instructions (1) through (4) as well as replicated instruction (4') to corresponding scheduler 121 of first processor core 201 in which these target instructions are carried out. In a similar manner, target instructions (1) through (4) as well as (4*) are carried out in second processor core 202.

After the individual instructions have been carried out and their results were stored in respective register r16 of the respective processor core, these individual results are compared to each other for error detection. This comparison is able to be performed by microprocessor 200 itself or also by an external arithmetic unit. In the latter case, the data of the corresponding registers may be read out by a direct memory access unit (DMA unit), for instance, and the data may be forwarded by the direct memory access unit to the external arithmetic unit, for instance by way of an Ethernet link or via a field bus such as an SPI.

What is claimed is:

1. A method for operating a microprocessor, comprising:
performing a binary translation by a conversion software implemented in the microprocessor, the binary translation including translating a source instruction in a binary manner into a target instruction, wherein the source instruction is encoded according to a first instruction-set architecture, and wherein the target instruction is encoded according to a second instruction-set architecture;

replicating by the conversion software the target instruction translated into the second instruction-set architecture;

in the replicated target instruction, replacing a memory area which is to be accessed in the course of executing the target instruction by a second memory area; and executing the target instruction and the replicated target instruction by the microprocessor.

2. The method as recited in claim 1, further comprising comparing a result of the executed target instruction and a result of the executed replicated target instruction.

3. The method as recited in claim 2, further comprising:

generating a comparison instruction by the conversion software with the replication of the target instruction, wherein the result of the executed target instruction and the result of the executed replicated target instruction are compared to one another during an execution of the comparison instruction.

4. The method as recited in claim 1, wherein:

the microprocessor includes at least two processor cores, and the conversion software is executed on at least two of the at least two processor cores.

5. The method as recited in claim 1, wherein:

the conversion software is executed on a first processor core of the microprocessor, and the translated target instruction is stored in a translation memory, the translated target instruction is read out from the translation memory by a second conversion software that is executed in a second processor core of the microprocessor, the second conversion software modifies the read-out translated target instruction in such a way that a memory area which is to be accessed in the course of an execution of the read-out target instruction is replaced by a third memory area, and the modified target instruction is executed in the second processor core.

6. The method as recited in claim 5, wherein:

the target instruction and the replicated target instruction are executed in the first processor core, and a result of the target instruction and the replicated target instruction executed in the first processor core and a result of the executed modified target instruction executed in the second processor core are compared to each other.

7. The method as recited in claim 1, wherein the microprocessor is used in a control device of a motor vehicle.

8. The method as recited in claim 7, wherein at least one of a safety-relevant function and a driver-assistance function of the motor vehicle is executed by executing the target instruction.

9. A microprocessor, comprising:

an arrangement for performing a binary translation by a conversion software implemented in the microprocessor, the binary translation including translating a source instruction in a binary manner into a target instruction, wherein the source instruction is encoded according to a first instruction-set architecture, and wherein the target instruction is encoded according to a second instruction-set architecture;

an arrangement for replicating by the conversion software the target instruction translated into the second instruction-set architecture;

an arrangement for, in the replicated target instruction, replacing a memory area which is to be accessed in the course of executing the target instruction by a second memory area; and an arrangement for executing the target instruction and the replicated target instruction.

10. A non-transitory machine-readable memory medium having a computer program stored therein, computer program inducing an arithmetic unit to execute a method for operating a microprocessor, the method comprising:

performing a binary translation by a conversion software implemented in the microprocessor, the binary translation including translating a source instruction in a binary manner into a target instruction, wherein the source instruction is encoded according to a first instruction-set architecture, and wherein the target instruction is encoded according to a second instruction-set architecture;

replicating by the conversion software the target instruction translated into the second instruction-set architecture;

in the replicated target instruction, replacing a memory area which is to be accessed in the course of executing the target instruction by a second memory area; and executing the target instruction and the replicated target instruction by the microprocessor.

* * * * *